United States Patent
Minamida et al.

(10) Patent No.: US 7,670,447 B2
(45) Date of Patent: Mar. 2, 2010

(54) METHOD FOR APPLYING ADHESIVE TO SUBSTRATE, SUBSTRATE, COATING DEVICE, METHOD FOR PRODUCING LAMINATED OBJECT, AND LAMINATED OBJECT

(75) Inventors: Yukihiko Minamida, Osaka (JP); Tomoaki Harada, Sakura (JP); Toyokuni Fujiwara, Osaka (JP); Takayoshi Ito, Ageo (JP); Nobuhiko Endo, Matsudo (JP)

(73) Assignee: DIC Corporation, Tokyo (JP)

( * ) Notice: Subject to any disclaimer, the term of this patent is extended or adjusted under 35 U.S.C. 154(b) by 352 days.

(21) Appl. No.: 10/508,955

(22) PCT Filed: Mar. 25, 2003

(86) PCT No.: PCT/JP03/03628

§ 371 (c)(1),
(2), (4) Date: Oct. 4, 2004

(87) PCT Pub. No.: WO2004/028708

PCT Pub. Date: Apr. 8, 2004

(65) Prior Publication Data

US 2005/0208299 A1  Sep. 22, 2005

(30) Foreign Application Priority Data

Sep. 24, 2002  (JP)  ............................. 2002-277619

(51) Int. Cl.
B32B 37/00 (2006.01)

(52) U.S. Cl. .................. 156/60; 156/281; 156/578; 427/207.1; 427/208.2

(58) Field of Classification Search ................. 156/578, 156/60, 324, 281; 427/207.1, 208.2
See application file for complete search history.

(56) References Cited

U.S. PATENT DOCUMENTS 3,313,218 A * 4/1967 Nichol .................. 493/132
3,940,525 A * 2/1976 Ballard .................. 428/96
4,045,946 A * 9/1977 Schaefer .................. 53/550
5,332,786 A * 7/1994 Nagata et al. ............ 525/130
5,702,760 A  12/1997 Kustermann ............. 427/172

FOREIGN PATENT DOCUMENTS

| GB | 2213406 A | * | 8/1989 |
| JP | 51-69688 | | 3/1973 |
| JP | 51-89688 | | 3/1973 |

(Continued)

OTHER PUBLICATIONS

European Search Report dated Aug. 2, 2006.

(Continued)

*Primary Examiner*—Jeff H Aftergut
(74) *Attorney, Agent, or Firm*—Edwards Angell Palmer & Dodge LLP

(57) ABSTRACT

A method for coating a substrate and a coating device used therein that can smoothly form an adhesive layer on the surface of a substrate without roughening, is provided which do not require a drying process and is free of various problems such as sick house syndrome stemming from use of organic solvents. In addition, a method of producing a laminated object using the coating method and the laminated object obtained thereby are provided. In the method for coating a substrate to form an adhesive layer on one surface of the substrate, while the substrate is being conveyed by applying a hot melt adhesive in a melted state via a rotating applicator roller, with the direction of rotation of the applicator roller and the direction of conveying the substrate being the same, adhesive is applied to the substrate while slipping the applicator roller by setting the circumferential speed of the applicator roller to be at least 20% slower or at least 20% faster than the predetermined speed at which the substrate is conveyed.

26 Claims, 2 Drawing Sheets

FOREIGN PATENT DOCUMENTS

| | | | |
|---|---|---|---|
| JP | 51-41102 | | 10/1976 |
| JP | 58-28376 A | * | 2/1983 |
| JP | 62-298477 | | 12/1987 |
| JP | 63-256159 | | 10/1988 |
| JP | 2-60674 A | * | 3/1990 |
| JP | 02-135174 | | 5/1990 |
| JP | 3-24640 | | 5/1991 |
| JP | 03-175028 A | * | 7/1991 |
| JP | 07-169105 A | * | 7/1995 |
| JP | 10-330709 | | 12/1998 |
| SU | 1074719 A | * | 2/1984 |
| WO | WO 97/15722 | | 5/1997 |
| WO | WO 99/07480 | | 2/1999 |

OTHER PUBLICATIONS

Notice of Reasons for Rejection mailed Aug. 5, 2008, issued on the corresponding Japanese Patent Application No. 2002-277619 and the English translation thereof.

Notice of Reasons for Rejection mailed Aug. 5, 2008, issued on the corresponding Japanese Patent Application No. 2002-277519 and the English translation thereof.

* cited by examiner

METHOD FOR APPLYING ADHESIVE TO SUBSTRATE, SUBSTRATE, COATING DEVICE, METHOD FOR PRODUCING LAMINATED OBJECT, AND LAMINATED OBJECT

TECHNICAL FIELD

The present invention relates to a method for applying an adhesive to a substrate, such as a wood board, by means of a rotating applicator roller with the object of applying a laminate such as a film or decorative paper onto the adhesive layer formed thereby, the substrate obtained by the method thereof, the coating device employed in the method, the method of producing a laminated object and the laminated object obtained thereby.

BACKGROUND ART

Conventionally, many types of furnishings and interior materials are decorated by coating the surface of their substrates, such as wood boards, with an adhesive and then applying a laminate such as a film, decorative paper or laminating material thereon.

Roller coaters are generally used for applying adhesive to a substrate such as a wood board. Roller coaters have two rollers for adjusting the application quantity of the adhesive, namely, an applicator roller and a metering roller, and a backing roller that applies pressure to the substrate and also conveys the substrate.

A water emulsion is generally employed as the adhesive used in this regard. The water emulsion is applied to a substrate such as a wood board to form an adhesive layer, with a film or decorative paper and the like is applied thereon. The resulting laminated object possesses a degree of smoothness and aesthetic appeal making it suitable for use in various furnishings and interior materials. In recent years, the demands on aesthetic appearance have increased, with a higher degree of surface smoothness being sought. As a result, conventional water emulsions used as adhesives are no longer up to the task.

Plywood, medium density fiber board (MDF), particle board, and the like, are used as the wood board to which the aforementioned film or decorative paper is bonded. Among these, the surface of plywood is a veneer having minute surface indentations. Applying an adhesive such as a water emulsion directly to the surface of plywood with an applicator roller results in minute indentations in the adhesive layer, inhibiting the formation of a smooth adhesive layer of uniform thickness. Such minute indentations, by showing through the surface of the applied film or decorative paper, are deleterious to smoothness and aesthetic appeal.

In order to remedy this defect, so-called sealing processing is performed involving the application of a sealer to the surface of a wood board to fill in concavities. This to some extent improves the smoothness of the surface, but still falls short of the exacting demands for smoothness in recent years as long as adhesives such as conventional water emulsions are used.

In addition, applying water emulsion adhesives to medium density fiber board (MDF) causes swelling of the medium density fiber board (MDF), which adversely affects smoothness.

Water emulsions generally contain certain amounts of organic solvent such as toluene or xylene. Their use in interior furnishing materials requires drying time after application of a film or decorative paper. In addition, their use in interior furnishing materials causes sick house syndrome. Furthermore, drying equipment is costly and providing installation space for such equipment is often difficult.

Solvent adhesives also have problems such as giving off a bad smell when dried and the residual solvent of the volatile organic compound being carcinogenic.

Besides the above water emulsion adhesives and solvent adhesives, hot melt adhesives such as ethylene vinyl acetate, polyamide, reactive urethane and reactive epoxy adhesives that solve problems related to sick house syndrome and volatile organic compounds are also available.

However, their higher viscosity compared to other adhesives leads to the problem of roughening occurring easily on the surface of the substrate. That is, when the applicator roller comes in contact with the surface of the wood board and when it is retracted from the board after applying the adhesive, the adhesive itself and the surface of the substrate are easily roughened due to the high viscosity of the adhesive. As a result, surface indentations after bonding of the film or decorative paper become noticeable, adversely affecting the aesthetic appeal. This problem becomes prominent when using hot melt adhesives.

Water emulsion adhesives are self leveling due to their high application quantity and relatively low viscosity. In contrast, hot melt adhesives are highly viscous, have a short open time after being applied to the surface of a wood board, and exhibit a sudden drop in temperature after application. Due to the accompanying sudden rise in viscosity, self leveling cannot be expected. Obtaining a smooth and thin adhesive layer of uniform thickness is therefore difficult, with roughening remaining as surface irregularities after the film or decorative paper is applied, adversely affecting the aesthetic appeal as an interior furnishing material.

It is conceivable to apply the adhesive to the back of the film or decorative paper, instead of the surface of the wood board, as a way to solve these problems. However, compared to applying the adhesive to the surface of the wood board, permeation of the adhesive applied on the film side into the wood board is insufficient, resulting in diminished bonding strength.

As described above, it is difficult to form a smooth and thin adhesive layer of uniform thickness on a substrate such as a wood board using conventional adhesives and coating equipment, and there remains scope for improving the smoothness of surfaces to which a film or decorative paper has been subsequently bonded.

Also, use of water emulsion adhesives or solvent adhesives entails a drying process, leading to problems related to drying equipment and providing space for such equipment as well as prolonging the work process. Problems such as sick house syndrome also arise from use of organic solvents.

DISCLOSURE OF INVENTION

Accordingly, it is an object of the present invention to provide a method for coating a substrate that can form a smooth adhesive layer without roughening of the substrate surface, the substrate obtained by the method thereof, the coating device employed in the method, a method of producing a laminated object and the laminated object obtained thereby.

It is a further object of the present invention to provide an efficient method for coating a substrate that does not require a drying process, and a coating device used in the method thereof.

It is yet another object of the present invention to provide a method for coating a substrate that does not cause problems such as sick house syndrome stemming from use of organic solvents, and a coating device used in the method thereof.

The present inventors confirmed that while some degree of smoothness of the adhesive layer is achieved on substrates such as plywood (both sealed and unsealed), medium density fiber board (MDF) and particle board when using conventional water emulsion adhesives and solvent adhesives, scope remains for improving the smoothness. They then set out to solve the aforementioned problems by using hot melt adhesives.

As a result, they succeeded in solving problems such as sick house syndrome stemming from use of organic solvents and achieved an efficient substrate coating method not requiring a drying process. However, they confronted the problem of roughening becoming prominent due to the high viscosity of hot melt adhesives.

In addition, as a result of combining investigations into coating equipment and coating conditions, the circumferential speed of the applicator roller and predetermined speed at which the substrate is conveyed, which are nearly the same in a conventional roller coater, were deliberately set to speeds differing by no less than 20% so as to apply adhesive on the substrate while causing the applicator roller to slip. By doing so, it was found that the surface of the substrate was smoothly coated without roughening and a smooth and thin adhesive layer of uniform thickness was obtained even when using wood boards such as unsealed plywood and medium density fiber board (MDF), thereby completing the invention.

In other words, the present invention provides a method for applying a hot melt adhesive in a melted state to a surface of a substrate being conveyed at a predetermined speed by rotating an applicator roller covered with the hot melt adhesive in a melted state at a circumferential speed at least 20% slower or at least 20% faster than the predetermined speed at which the substrate is conveyed to cause it to slip while contacting the substrate.

Setting the circumferential speed of the applicator roller to be at least 20% slower or at least 20% faster than the predetermined speed at which the substrate is conveyed causes the applicator roller to slip while thinly applying the adhesive to the substrate. Doing so applies a rubbing force that minimizes roughening of the adhesive layer of the substrate surface when the applicator roller is retracted, thereby preventing irregularities such as coating unevenness and pinholes to allow the smooth formation of a thin adhesive layer of uniform thickness. Applying a laminate such as a film, decorative paper or laminating material thereon produces an aesthetically pleasing finish free of indentations.

Note that the lower the coefficient of friction between the applicator roller and the surface of the substrate to which the adhesive is applied, the easier the roller slips. For example, a smooth steel roller slips easier than a smooth rubber roller. Also, regarding resin rollers, although depending on the type of resin, a normal hard type has a lower coefficient of friction than a rubber roller and therefore slips easier.

Forming an adhesive layer by applying a plurality of coatings of a hot melt adhesive can also minimize roughening by reducing the thickness of the adhesive layer applied in a single coating. Forming an adhesive layer by building up a plurality of thin adhesive coatings serves to prevent irregularities such as coating unevenness and pinholes, thereby enabling the formation of a smooth adhesive layer. In this case, either the front applicator roller positioned upstream in the direction of conveying the substrate or the rear applicator roller positioned downstream in the direction of conveying the substrate is preferably a rubber roller. In particular, using a rubber applicator roller in at least one stage of a plurality of applicator roller stages enables close tracking of surface contours even for substrates with a low thickness tolerance having indentations and varying thickness, making uniform coating of an adhesive easy.

Rubber rollers are preferably those obtained from rubber materials such as, for example, fluororubber, silicon rubber or butyl rubber.

The speed reduction ratios of the front stage applicator roller and rear stage applicator roller, expressed by an equation (1), relative to the predetermined speed at which the substrate is conveyed may be the same or one may be greater than the other.

$$\text{Speed reduction ratio (\%)} = (\text{conveying speed of substrate} - \text{circumferential speed of applicator roller}) \times 100 / \text{conveying speed of substrate} \qquad (1)$$

For example, if the rear stage applicator roller is made of a material having a lower coefficient of friction than the front stage applicator roller (that is, an easy-to-slip material), then the rear stage applicator roller may be made to slip less by setting its speed reduction ratio to be less than the front stage applicator roller. When applying a plurality of adhesive coatings, the surface of the substrate can be more smoothly finished by making the applicator roller that applies later adhesive layers from an easy-to-slip material. Of course, the front stage applicator roller can also be made of a material having a lower coefficient of friction (an easy-to-slip material) compared to the rear stage applicator roller.

The speed reduction ratio of the applicator rollers used the present invention is at least 20%, and preferably ranges from 20% to 80%. Setting the speed reduction ratio of the circumferential speed of the applicator roller to be within the specified range causes the applicator roller to slip and rub against the adhesive layer, making it easy to apply a uniform coating (covering) to the surface of a substrate.

During slippage of the applicator roller as above, "speed reduction" was set by making the circumferential speed of the applicator roller to be lower than the conveying speed of the substrate such as a wood board. However, the present invention is not limited to such a constitution, with "speed increase" also settable by increasing the circumferential speed of the applicator roller relative to the predetermined speed at which the substrate is conveyed.

In the present invention, speed increase is defined by an equation (2) below.

$$\text{Speed increase ratio (\%)} = (\text{circumferential speed of the applicator roller} - \text{conveying speed of substrate}) \times 100 / \text{conveying speed of substrate} \qquad (2)$$

The speed increase ratio of the applicator roller to the substrate such as a wood board may be set to a range of 20% to 150%. The slippage effect is effectively exhibited by setting the speed increase of the applicator roller to the substrate within this range, thereby smoothing the adhesive layer to obtain a coating (covering) layer with excellent smoothness.

The substrate according to the present invention is characterized by being obtained by any of the aforementioned substrate coating methods.

The present invention enables the formation of a thin and smooth adhesive layer on the surface of a wide range of substrates, even those with unsealed surfaces, including wood boards such as plywood (including unsealed plywood), medium density fiber board and particle board; incombustible boards such as calcium silicate board, straight board and volcanic silicate multi-layer board; plastic boards such as fiber reinforced plastic board and acrylic board; and metal sheets such as steel plate and stainless steel plate. Particularly for unsealed wood boards, a smooth adhesive layer can be formed without roughening of the surface of the substrate. Bonding a laminate such as a sheet, film, decorative paper, laminate material or metallic paper thereon imparts a high degree of smoothness and aesthetic appeal to the surface, making it suitable for architectural materials such as decorative panels, particularly for interior furnishings.

Unless otherwise specified, substrates referred to in the present invention may be both those that have been sealed and those that are unsealed.

The device for coating a substrate by applying adhesive to a surface of a substrate according to the present invention is provided with a device for conveying the substrate at a predetermined speed and an applicator roller for applying an adhesive, particularly a hot melt adhesive in a melted state, with the applicator roller slipping by rotating at a circumferential speed at least 20% slower or at least 20% faster than the predetermined speed at which the substrate is conveyed.

Making the predetermined speed at which the substrate is conveyed and the circumferential speed of the applicator roller differ by at least 20% imparts a rubbing force by causing the applicator roller to slip relative to the adhesive layer applied to the substrate. This enables the formation of a thin and smooth adhesive layer with marginal coating unevenness.

The device for conveying the substrate in the device for applying adhesive of the present invention may be a backing roller positioned opposite to the applicator roller so as to pinch the substrate or a conveyor belt with a vacuum chucking mechanism. A backing roller positioned opposite the applicator roller or a vacuum conveyor belt can convey the substrate by pinching the substrate. Employing a vacuum conveyor belt particularly enables elimination of a speed differential with the substrate. A vacuum box and the like can be used as the vacuum chucking mechanism.

The device for coating a substrate of the present invention has multiple stages of applicator rolls arranged along the conveying direction of the substrate. The rear stage applicator roller positioned downstream in the conveying direction of the substrate can be made of a material that slips easier (a material with a lower coefficient of friction) than the front stage applicator roller positioned upstream in the conveying direction of the substrate.

When multiple stages of applicator rollers slip while sequentially applying coatings so as to apply a plurality of adhesive coatings, making the rear stage applicator roller to slip easily can improve the finish of the adhesive layer applied by the front stage applicator roller by eliminating unevenness and pinholes and the like.

Either the rear stage applicator roller positioned downstream in the conveying direction of the substrate or the front stage applicator roller positioned upstream in the conveying direction of the substrate is preferably a rubber roller. Using a rubber applicator roller in at least one stage of a plurality of applicator roller stages enables close tracking of surface contours even for substrates with a low thickness tolerance having indentations and varying thickness, making uniform coating of an adhesive easy.

Rubber rollers made of a similar rubber material as above can be used as the rubber rollers in the device for coating a substrate of the present invention.

The device for coating a substrate of the present invention may be provided with nipping mechanisms upstream and downstream in the conveying direction of the applicator roller to hold and convey the substrate. Holding and conveying the substrate with at least either nipping mechanism improves accuracy in setting the speed of the substrate, thereby allowing precise setting of the speed differential with the applicator roller to enable stable slippage of the applicator roller.

Also, the nipping mechanism positioned downstream of the applicator roller in the device for coating a substrate of the present invention may be provided with a laminate supply roller on the side of the substrate coated with adhesive or a laminating roller to apply the laminate to the substrate with the adhesive.

For example, use of the laminating roller as part of the nipping mechanism can serve to reduce the number of rollers.

In the method of producing a laminated object according to the present invention, a hot melt adhesive is applied in a melted state to a surface of a substrate being conveyed at a predetermined speed by rotating an applicator roller covered with the hot melt adhesive in a melted state at a circumferential speed at least 20% slower or at least 20% faster than the predetermined speed at which the substrate is conveyed to cause it to slip while contacting the substrate, with a laminate then applied on the adhesive layer. Particularly after the adhesive layer is formed on the substrate, it is preferable that application of the laminate rolled up on the laminating roller and the like be performed while the adhesiveness of the adhesive layer is retained. In doing so, a thin adhesive layer of uniform thickness can be smoothly formed minimizing roughening of the adhesive layer when removing the applicator and preventing coating unevenness and pinholes to obtain a laminated material having an aesthetically pleasing finish free of indentations when the laminate is bonded.

Adhesive may be applied by a plurality of applicator rollers in the method of producing a laminated object according to the present invention.

In the method of producing a laminated object according to the present invention, the substrate is preferably a wood board, the adhesive is preferably a reactive urethane hot melt adhesive, and the laminate is preferably a film or decorative paper.

The laminated object of the present invention is characterized by being obtained by the aforementioned method of producing a laminated object.

BEST MODE FOR CARRYING OUT THE INVENTION

Below, the embodiments of the present invention are explained with reference to the drawings.

Figure 1:
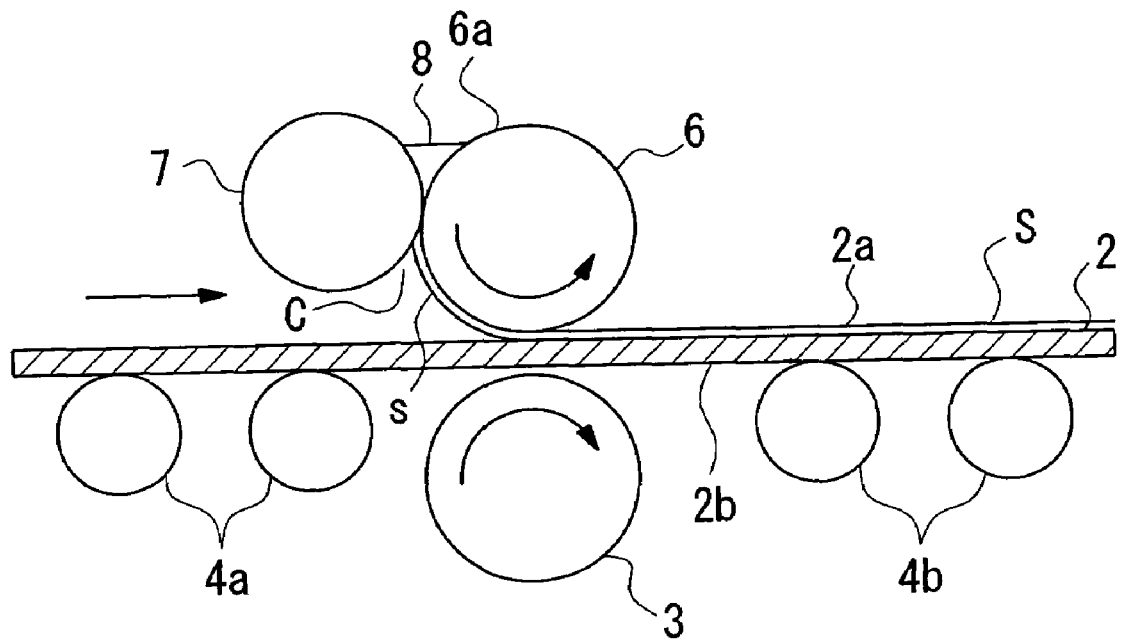
FIG. 1 is a schematic diagram of the device for coating a substrate according to the first embodiment of the present invention.

FIG. 1 is a diagram showing a schematic view of the device for coating a substrate according to the first embodiment of the present invention.

In the device for coating a substrate according to the first embodiment of the present invention, as the conveying device for conveying the substrate, such as a wood board 2, a backing roller 3 coupled to a drive source is disposed on back surface 2b of the wood board 2, with a suitable number of freely turning feed rollers 4a and 4b (each a pair in FIG. 1) provided in front and back in the direction of conveying the wood board 2.

Here, the wood board 2 is a rectangular board having a width of 400 to 1,500 mm, a length of 700 to 5,000 mm and a thickness of 1 to 50 mm. It may be entirely constituted of wood or may be constituted of a substrate having another material having wood such as a veneer attached only to top surface 2a coated (covered) with an adhesive.

Applicator roller 6 is positioned on the top surface 2a of the wood board 2 to oppose the backing roller 3, with a metering roller 7 positioned relative to outer surface 6a of the applicator roller via adjustable gap C. A pool 8 holding a liquid adhesive s (for example, a melted hot melt adhesive and the like in a liquid state) is formed between the applicator roller 6 connected to the drive source and the metering roll 7, respectively. The heated liquid adhesive s in the pool 8 is applied to the outer surface 6a of the applicator roller by rotation of the applicator roller 6. The applied amount of the adhesive s is set depending on the size of the gap C and the circumferential speed differential between the applicator roller 6 and the metering roller 7.

The heated liquid adhesive s is supplied as needed from, for example, the upper nozzle to the liquid holder 8. When the adhesive s is a hot melt adhesive, the applicator roller 6 and metering roller 7 are heated to a suitable temperature, thereby maintaining the adhesive collected in the pool 8 in a melted state.

As shown in FIG. 1, setting the direction of rotation of the applicator roller 6 and the conveying direction of the wood board 2 in the same direction (anticlockwise in FIG. 1) applies the adhesive s in the pool 8 to the outer surface 6a, thereby supplying it to the top surface 2a of the wood board 2 to enable coating of the entire top surface 2a.

A hot melt adhesive is used as the adhesive in the present invention, with a reactive hot melt adhesive being particularly preferable.

A reactive hot melt adhesive in the present invention is an adhesive that imparts reactivity to a hot melt adhesive with the aim of forming a bridged structure by some chemical reaction and includes, specifically, urethane reactive hot melt adhesives having isocyanate groups in their molecules, silane reactive hot melt adhesives having silyl groups in their molecules, ultraviolet ray-curable reactive hot melt adhesives having functional groups reacting by ultraviolet rays and electron ray-curable reactive hot melt adhesives. Among these, urethane reactive hot melt adhesives, which have isocyanate groups in their molecules, can exhibit excellent adhesive performance and durability through the hardening reaction with the moisture contained in the substrate such as a wood board, and so are preferable.

While hot melt adhesives have the property to repeatedly melt when heated and harden when cooled, reactive hot melt adhesives have the property of complete hardening whereupon, once the hardening reaction is finished, they cannot melt even by reheating.

Moreover, while hot melt adhesives such as ethylene vinyl acetate, polyamide adhesives must be heated to around 180° C. in order to be kept in a melted state, reactive hot melt adhesives can be kept in a melted state with a lower heating temperature of around 100 to 130° C. Particularly when the object to be coated is a wood board, this has the advantage of not causing heat damage to wood materials during coating due to the material being wood.

The aforementioned urethane reactive hot melt adhesive includes an isocyanate-ended urethane prepolymer that protects an isocyanate group obtained by reaction with a polyol component and polyisocyanate component, and alkoxysilane-ended urethane polymer that bonds hydrolytic silyl groups to the urathane prepolymer.

The polyol component and polyisocyanate component of the isocyanate-ended urethane prepolymer are obtained with an equivalence ratio of the NCO group of the isocyanate and hydroxyl group of the polyol greater than 1, that is, by excessively reacting the NCO group. Normally, the equivalence ratio of the NCO group/hydroxyl group is preferably in a range of 1.1 to 5.0, and more preferably in a range of 1.5 to 3.0.

The alkoxysilane-ended urethane polymer can be obtained by reacting a compound having both a functional group reactable with an isocyanate group and hydrolytic silyl groups with the aforementioned isocyanate-ended urethane prepolymer.

Polyol components usable in the aforementioned urethane reactive hot melt adhesive include, for example, polyester diols, polyether diols and their mixtures or coplymers. Acrylic polyols, polycarbonate polyols, polyolefine polyols, castor oil polyols, polyalcohols and their mixtures or copolymers are also included.

As the polyisocyanate component, although not particularly specified, aromatic diisocyanate such as phenylenediisocyanate, tolylenediisocyanate (TDI), 4,4'-diphenylmethanediisocyanate, 2,4-diphenylmethanediisocyanate and naphthalenediisocyanate, as well as aliphatic or alicyclic diisocyanates such as hexamethylenediisocyanate, lysinediisocyanate, cyclohexanediisocyanate, isophoronediisocyanate, dicyclohexylmethanediisocyanate, xylylenediisocyanate, tetramethylxylylenediisocyanate are also included. Among these, it is preferable to use diphenylmethanediisocyanate (MDI), which has low steam pressure during heating.

As a urethane reactive hot melt adhesive used in the present embodiments of the present invention, those that melt in a temperature range of 100 to 130° C. and have a viscosity of 1,000 to 30,000 mPa·s are preferred. Among these, polyester polyol-type urethane reactive hot melt adhesives are preferred due to their excellent initial adhesive strength.

Urethane reactive hot melt adhesives obtained by combined use of polyether polyols and other polyols, for example, acrylic polyols, with polyester polyols are particularly preferred.

In the present invention, the circumferential speed of the applicator roller 6 is set to a magnitude differing from the speed of the backing roller 3, and in the present embodiment the circumferential speed of the applicator roller 6 is set to be less. The wood board 2 moves in a horizontal direction corresponding to the circumferential speed of the backing roller 3. The conveying speed of the wood board 2 is set to a speed between the speed of the backing roller 3 and the speed of the applicator roller 6 by the frictional force due to the slippage of the applicator roller 6, which rotates at a slower speed, against the wood board 2. The direction of rotation of the applicator roller 6 and the conveying direction of the wood board 2 are in the same direction. A smooth adhesive layer S of uniform thickness is formed with suppressed roughening by slippage of the applicator roller 6, which supplies and transfers the adhesive s to the top surface 2a of the wood board (MDF).

Excellent smoothness can be achieved by the present invention even when the wood board 2 is, for example, particle board (sealed or unsealed) or medium density fiber board.

The circumferential speed of the applicator roller 6, expressed by the equation (1) below, is reduced by a range of 20% to 80% based on the conveying speed of the substrate, such as the wood board 2.

$$\text{Speed reduction ratio (\%)} = (\text{conveying speed of substrate} - \text{circumferential speed of applicator roller}) \times 100 / \text{conveying speed of substrate} \quad (1)$$

With a speed reduction ratio in this range, the applicator roller 6 can definitely apply adhesive layer S at a uniform, thin thickness by slipping against the top surface 2a.

The speed reduction ratio of the applicator roller 6 needs to be adjusted within this range depending on the material of the wood board 2 and the applicator roller 6. Since metal generally slips easily due to its low coefficient of friction, the speed differential with the wood board 2 may be small. While changes in the wood board 2 due to its material are minimal owing to its woodiness, when the outer surface 6a of the applicator roller is formed from metal (for example, steel), the speed reduction ratio is preferably in a range of 20 to 50%, and more preferably in a range of 22% to 30%.

On the other hand, rubber needs to have a greater speed differential with the wood board 2 due to its property of being comparatively less subject to slipping owing to its coefficient of friction generally being greater than metal. When at least outer surface 6a of the applicator roller 6 is composed of, for example, rubber, the speed reduction ratio is preferably in a range of 30% to 80%, and more preferably in a range of 40% to 60%.

The relation of the applicator roller 6 to the backing roller 3 is an important factor in the applicator roller 6 slipping against the top of wood board 2 and applying the adhesive to the top surface 2a of the wood board 2 at the required thickness. That is, if the applicator roller 6 is made of rubber (including those with only a rubber surface), the backing roller 3 is preferably made of a harder material than the applicator roller 6, such as metal. If the applicator roller 6 is made of metal, then the backing roller 3 is preferably made of a softer material than the applicator roller 6, such as rubber (including those having only a rubber surface). In addition, while applying adhesive to the top surface 2a of the wood board 2, the applicator roller 6 presses against the surface to minimize roughening of the adhesive, thereby forming a smooth adhesive layer S of uniform thickness. Since proper coating is not performed with excessive pushing force and a smooth surface is not formed with insufficient pressure, it is desirable to adjust the clearance between the applicator roller 6 and the backing roller 3 to a range of 99% to 95% of the thickness of the substrate, such as the wood board 2. Of course, the width of the clearance can change depending on the characteristics of the substrate.

Given the need to warm the roller surface when using rubber as the lining of the applicator roller, it is preferable to use fluororubber or silicon rubber and the like having excellent heat resistance.

Giving consideration to not lowering the thermal conductivity and the surface hardness, the thickness of the lining of the applicator roller is preferably 3 to 10 mm and more preferably 4 to 8 mm.

The surface hardness of the applicator roller lining preferably is a Shore A hardness ranging from 60 to 95, and more preferably ranging from 70 to 90, having excellent wear resistance and pressure recovery.

The aforementioned warming of the applicator roller is performed by a publicly known heating medium circulation, heating pipe or embedded heater and the like, with coating performed by temperature control in accordance with the melting/flowability of the adhesive.

When using a steel roller as the applicator roller in the above, it is desirable to use one having a surface that is hard chromium plated and polished from the standpoint of abrasion resistance.

The device for coating a substrate in the present embodiment has the aforementioned constitution. The substrate coating method will now be explained.

In FIG. 1, the wood board 2 is conveyed at a fixed speed by the backing roller 3 and applicator roller 6 while being horizontally supported by front and back feed rollers 4a and 4b, with top surface 2a made of wood facing applicator roller 6.

The applicator roller 6 is positioned on the top surface 2a of the wood board 2. The adhesive s is applied to the outer surface 6a from the pool 8 between the applicator roller 6 and the metering roller 7 by rotation of the applicator roller 6 at the required speed in the conveying direction of the wood board 2. The adhesive coating S is applied by the transfer of the adhesive s to the top surface 2a at the place of contact with the wood board 2.

When the outer surface 6a of the applicator roller 6 is retracted from top surface 2a of the substrate coated by the adhesive, roughening of the adhesive s, which has high viscosity, occurs easily when the applicator roller 6 and the wood board 2 have the same speed. However, making the applicator roller 6 slip by slowing the circumferential speed of the applicator roller 6 to 80% or less of the conveying speed of the wood board 2, for example, can prevent roughening of the adhesive and smoothen it by the working of a rubbing force on the adhesive layer S of the top surface 2a of the substrate. In particular, lessening the coating quantity of the adhesive s minimizes roughening of a layer, allowing the smooth formation of the adhesive layer S having thin thickness. The thickness of the adhesive layer in this regard is not particularly restricted, but normally ranges from 20 to 80 μm, and can be achieved by supplying adhesive from the applicator roller 6 to the substrate surface at 15 to 60 g/m².

In the following process, a laminate such as resin film or decorative paper is bonded to the top surface 2a via the adhesive layer S. A resin film can be a single layer or multi layer one having a thickness of 30 to 550 μm and may contain vinyl chloride, olefin or polyethylene terephthalate.

In the embodiment, with the circumferential speed of the backing roller 3 set to 50 meters per minute, the circumferential speed of the applicator roller 6 set to 25 meters per minute, the conveying speed of the wood board 2 is reduced to about 38 meters per minute by transfer of the adhesive s via contact with the applicator roller 6 and slippage.

According to the aforementioned present embodiment, smooth adhesive layer S having a thin thickness can be formed on top of the wood board 2 without roughening regardless of whether a high viscosity hot melt adhesive is used as the adhesive, preventing irregularities on the surface that bonds with a film, decorative paper or laminate film and the like to enable production of an interior material having aesthetic appeal.

The adhesive temperature can be maintained in a relatively low temperature range of 100 to 130° C., thereby reducing damage to the wood board 2 to enable the obtainment of an interior material having excellent adhesive strength, heat resistance and durability.

Next, other embodiments of the present invention will be explained, using the same reference symbols for identical or similar portions as the aforementioned embodiment.

Figure 2:
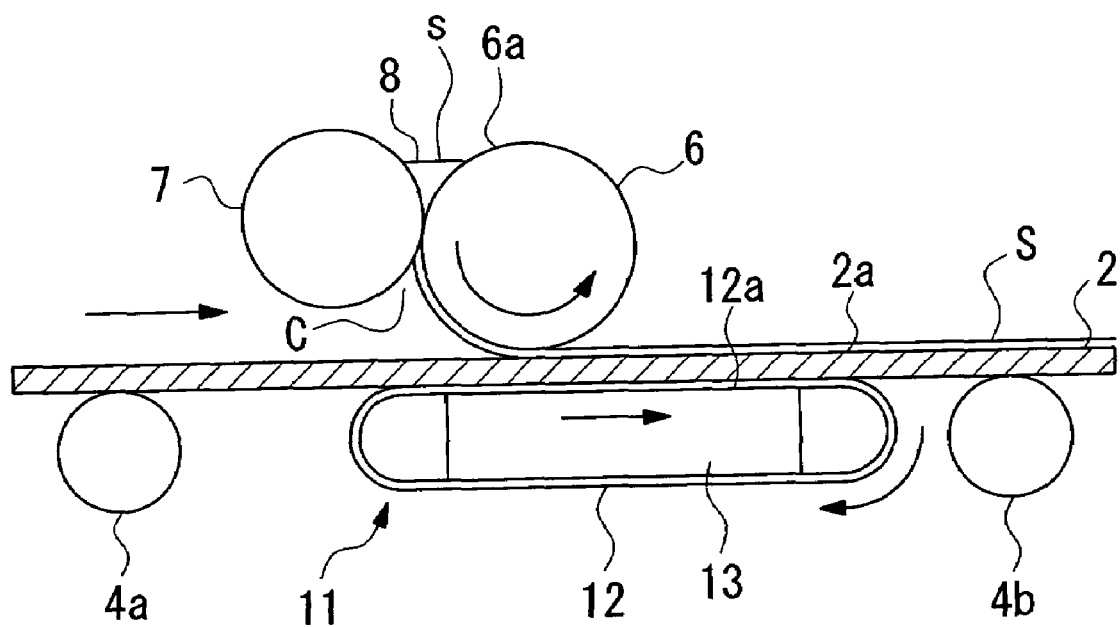
FIG. 2 is a schematic diagram of the device for coating a substrate according to the second embodiment of the present invention.

In the coating device according to the second embodiment shown in FIG. 2, the difference with the coating device showing in the first embodiment is the provision of vacuum box conveyor 11 in place of the backing roller 3. According to this constitution, elliptical conveyor belt 12 is disposed under the back surface 2b of the wood board 2 so that the upper belt portion 12a of the flat portion contacts the back surface 2b of the wood board 2. Vacuum box 13 inside the unit of the conveyor belt 12 provides suction via upper belt portion 12a to suct the wood board 2.

In this type of constitution, activation of vacuum box conveyor 11 makes the wood board 2 adhere to the upper belt portion 12a via vacuum box 13 in conjunction with the rotation of conveyor belt 12, thereby conveying it at the same speed as conveyor belt 12.

As a result, no speed differential occurs between conveyor belt 12 conveying the wood board 2 and the wood board 2, simplifying the setting of the speed differential between applicator roller 6 and the wood board 2 and enabling slippage of the applicator roller 6 to be definitely achieved.

Next, the coating device according to the third embodiment of the present invention will be explained with reference to FIG. 3.

Figure 3:
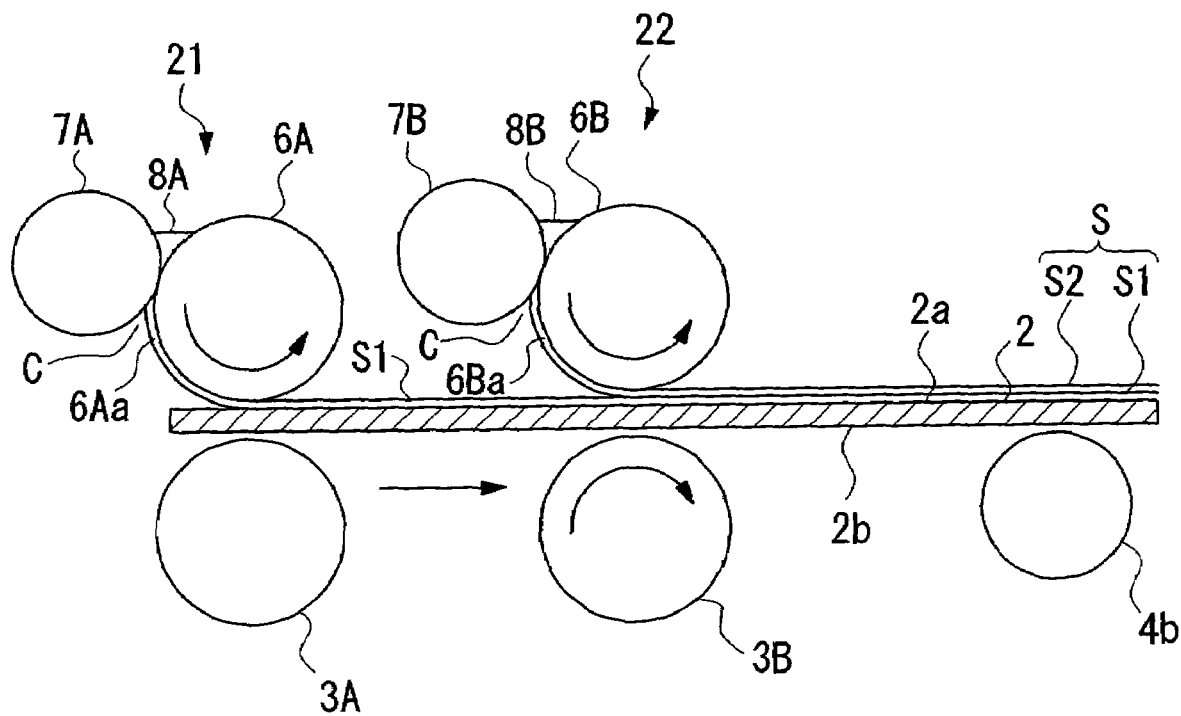
FIG. 3 is a schematic diagram of the device for coating a substrate according to the third embodiment of the present invention.

The coating device shown in FIG. 3 has two coating stages, each having a backing roller positioned on the opposite side and an applicator roller that together pinch the wood board 2, so as to apply the adhesive s two separate times.

In FIG. 3, the first applicator section 21 is positioned upstream in the conveying direction of the wood board 2 and the second applicator section 22 is positioned downstream in the conveying direction. First applicator section 21 has a first backing roller 3A that contacts the back surface 2b of the wood board 2 and a first applicator roller 6A provided to contact the top surface 2a of the wood board 2 in a position facing first backing roller 3A to pinch the wood board 2. The first metering roller 7A is positioned at the first applicator roller 6A through gap C, and a first pool 8A holding the adhesive s is provided between the first applicator roller 6A and the first metering roller 7A. At least the outer surface 6Aa of the first applicator roller 6A is made of rubber.

The second applicator section 22, positioned downstream in the conveying direction of the first applicator section 21, has an identical constitution to the first applicator section 21. Second backing roller 3B on the back surface 2b and second applicator roller 6B on the top surface 2a are positioned to face each other. A second pool 8B is provided between the second applicator roller 6B and the second metering roller 7B. At least the outer surface 6Ba of the second applicator roller 6B is made of metal (for example, steel), so as to have a lower coefficient of friction that the first applicator roller 6A made from rubber, and thereby have the property of slipping easier.

Furthermore, using a rubber roller for the first applicator roller 6A enables its outer surface 6Aa to follow the contours of the top surface 2a of the wood board 2 via elastic deformation and thereby reducing coating unevenness. Using a metal roller for the second applicator roller 6B smoothens the coating surface to obtain a thin coating surface of uniform thickness.

The speed reduction ratio of the second applicator roller 6B is set to be less than the speed reduction ratio of the first applicator roller 6A relative to the wood board 2 (or may be set to the same ratio). For example, the speed reduction ratio of the first applicator roller 6A is set to range from 40% to 60% and the speed reduction ratio of the second applicator roller is set to range from 20% to 40%.

In addition, the coating thickness of the adhesive s applied by the applicator rollers 6A and 6B can be set to about half of that in the first and second embodiments. In this regard, it is desirable to adjust the clearance between the first applicator roller 6A and first backing roller 3A to be about, for example, 99% to 95% of the thickness of the substrate. It is preferable to make the clearance between the second applicator roller 6B and second backing roller 3B about the same or somewhat larger. The widths of these clearances can be altered in accordance with the characteristics of the substrate. It is preferable for each applicator roller and backing roller to be adjusted by, for example, an air cylinder and the like so as to apply a constant pressure to the substrate.

At least one feed roller 4b may be provided on the back surface 2b to pinch the wood board 2.

When a coating device according to the embodiments of the present invention applies the adhesive s to the top surface 2a of the wood board 2 by having the aforementioned constitution, the wood board 2 is conveyed at a constant speed by first and second backing rollers 3A and 3B, with the top surface made of wood facing the first and second applicator rollers 6A and 6B. The adhesive s is first applied from the pool 8A to the outer surface 6Aa by the rotation of applicator roller 6A of the first applicator section 21. The adhesive s is then transferred to top surface 2a of the wood board 2 to form first adhesive layer S1 having a thin thickness.

The first applicator roller 6A then slips against the top surface 2a of the wood board 2, with the rubbing force acting on the first adhesive layer S1 of the top surface 2a to achieve smoothing by preventing roughening when the first applicator roller 6A is retracted from the wood board 2.

Next, in the second applicator section 22, the second applicator roller 6B similarly transfers the adhesive s to form second adhesive layer S2 on top of the first adhesive layer S1. Moreover, at least the outer surface 6Ba of the second applicator roller 6B is made of metal, so as to slip easier than the first applicator roller 6A and have a greater rubbing force. This serves to eliminate pin holes and coating unevenness in the first adhesive layer S1 to enable formation of the second adhesive layer S2 that is smoother and has uniform thickness. Moreover, the thicknesses of adhesive layers S1 and S2 are thin, thereby minimizing roughening.

In this way, a single adhesive layer S that is smooth and free of uneven thickness can be formed by the two thin adhesive layers S1 and S2 thus formed.

The invention is not restricted to two stages, with sequential lamination possible over three or more stages of adhesive layers S1 and S2 and so on by applicator rollers 6A and 6B, and so on. Also, while the same adhesive is applied at each stage, different types may also be laminated.

Forming adhesive layer S by laminating the first adhesive layer S1 and the second adhesive layer S2 and so on having a thinner thickness over multiple stages according to the aforementioned embodiment enables further suppression of roughening during contact by making each adhesive layer thinner. Adhesive coating over multiple stages thus enables formation of a more uniform and smoother adhesive layer S.

Also, using a material for the second applicator roller 6B of the rear stage that slips easier than the first applicator roller 6A of the front stage enables finishing that eliminates thickness unevenness and pinholes that remain in the first adhesive layer S1, thereby finishing adhesive layer S that is smoother and having a thin thickness.

When first applicator roller 6A is made of rubber, the first backing roller 3A is preferably made from a harder material than the first applicator roller 6A, such as metal. Also, when the second applicator roller 6B is made of metal, the second backing roller 3B is preferably made from a softer material than the second applicator roller 6B, such as rubber (including those having only a rubber covered surface).

A roller made of a material other than rubber, such as metal (for example, steel) or a hard resin, may be employed as the first applicator roller 6A. When the first applicator roller 6A is made of metal or hard resin, the first backing roller 3A is preferably made of rubber.

The second applicator roller 6B may be made of a material other than metal such as rubber, with one made of a material other than metal such as rubber or resin having high frictional resistance when the first applicator roller 6A is metal. When the second applicator roller 6B is made of a material other than metal such as rubber, the second backing roller 3B is preferably made of a material such as metal having low frictional resistance.

Furthermore, when the first applicator roller 6A is made of a material other than rubber such as metal (for example, steel) or hard resin and the second applicator roller 6B is rubber, it is desirable for the speed reduction of the second applicator roller 6B to be greater than that of the first applicator roller 6A.

The fourth embodiment of the present invention will now be explained with reference to FIG. 4. In the coating device shown in FIG. 4, relative to the coating section having the backing roller 3 and the applicator roller 6 positioned facing each other to pinch the wood board 2, a first nipping device 31 and a second nipping device 32 are provided in front and back in the direction of conveying the wood board 2 to pinch the wood board 2 and convey it. The constitution of the coating section is identical to the first embodiment.

As the first nipping device 31 provided upstream in the direction of conveying the wood board 2, a pair of supply rollers 33A and 33B are positioned facing each other, pinching the wood board 2. As the second nipping device 32 provided downstream in the direction of conveying the wood board 2, a feed roller 34 is positioned on the back surface 2b and a laminating roller 35 is positioned on the top surface 2a to face each other and pinch the wood board 2. Each roller 33A, 33B, 34 and 35 is connected to a drive mechanism.

Laminate film F wound around an uncoiler not shown in the figure is unreeled by the laminating roller 35, with the film F laminated on top of the adhesive layer S that is applied on the wood board 2 by the applicator roller 6 so as to be pressure bonded.

The first nipping device 31 and second nipping device 32 pinch the wood board 2 so as to convey it at the required speed. The conveying speed of the wood board 2 by the first nipping device 31 and second nipping device 32 is set to be constant.

The length L1 of the wood board 2 is made longer than the length L0 from the rotation axis of each of the supply rollers 33A and 33B of the first nipping device 31 to the rotation axis of the feed roller 34 of the second nipping device 32 and the laminating roller 35.

With this kind of constitution, applying the adhesive s by the applicator roller 6 while conveying the wood board 2 by the first nipping device 31 and the second nipping device 32 enables stable application of the adhesive layer S while securely conveying the wood board 2 at the required speed by at least either one of first nipping device 31 and second nipping device 32. When the wood board 2, whose top surface 2a is coated with the adhesive s by applicator roller 6, is conveyed by the second nipping device 32, film F is laminated on top of the adhesive layer S via the laminating roller 35 so as to be pressure bonded.

According to the present embodiment, since the conveying speed of the wood board 2 is set by the first nipping device 31 and second nipping device 32 independently of the backing roller 3, the conveying speed of the wood board 2 is stable, and the speed differential with the applicator roller 6 can be reliably set to achieve more stable coating and slippage.

First nipping device 31 and second nipping device 32 need not always be provided as a nipping mechanism in front or in back of the applicator roller 6, but instead may be provided only upstream or downstream of the applicator roller 6 so as to convey the wood board 2 together with the applicator roller 6 and the backing roller 3.

In addition, a plurality of applicator sections 21, 22 according to the third embodiment may be applied to the coating device according to the fourth embodiment.

Alternatively, instead of the constitution providing a plurality of applicator sections 21, 22 according to the third embodiment, adhesive layer S of the required thickness may be formed by multiple lamination of thin adhesive layers S1 and S2 and so on by passing the wood board 2 multiple times through the coating device according to the first embodiment.

Note that in the third embodiment, by making the first and second applicator rollers 6A and 6B of the same material, an identical effect can by obtained by setting the speed reduction of the second applicator roller 6B on the rear side to be less than the speed reduction of the first applicator roller 6A of the front side.

Also, the substrate is not limited to the wood board 2, with various materials being employable, and the shape is not limited to rectangle, with band-shaped ones and the like also being acceptable.

While the applicator roller and backing roller are not restricted to particular combinations of materials, when one is made of metal and the other of rubber, the rubber one absorbs rebound of the wood board, thereby securely conveying the board, and so this is the preferred combination.

As stated above, particularly when coating by multiple stages of applicator rollers, using an applicator roller made of rubber in the front stage and an applicator roller made of metal in the rear stage enables the obtainment of a thin and uniform coating surface free of coating unevenness, and so is preferred.

Publicly known devices may be employed for adjusting the circumferential speed of applicator roller 6 relative to the predetermined speed at which the substrate is conveyed. The speed of the laminating roller 35, backing roller 3 or first nipping device 31 may be used as the reference conveying speed. The speed of the applicator rollers may be adjusted via the roller drive members and mechanical transmission device such as a belt drive, planetary gearing, friction gearing, and the like.

In consideration of ease of speed adjustment and freedom of installation space, an inverter motor or servo motor and the like may be provided in the drive member of the applicator roller at the electric signal of the reference speed so that a coating speed suitable to the substrate or adhesive characteristics can be easily set with a publicly known speed control device.

FIRST EXAMPLE

Figure 4:
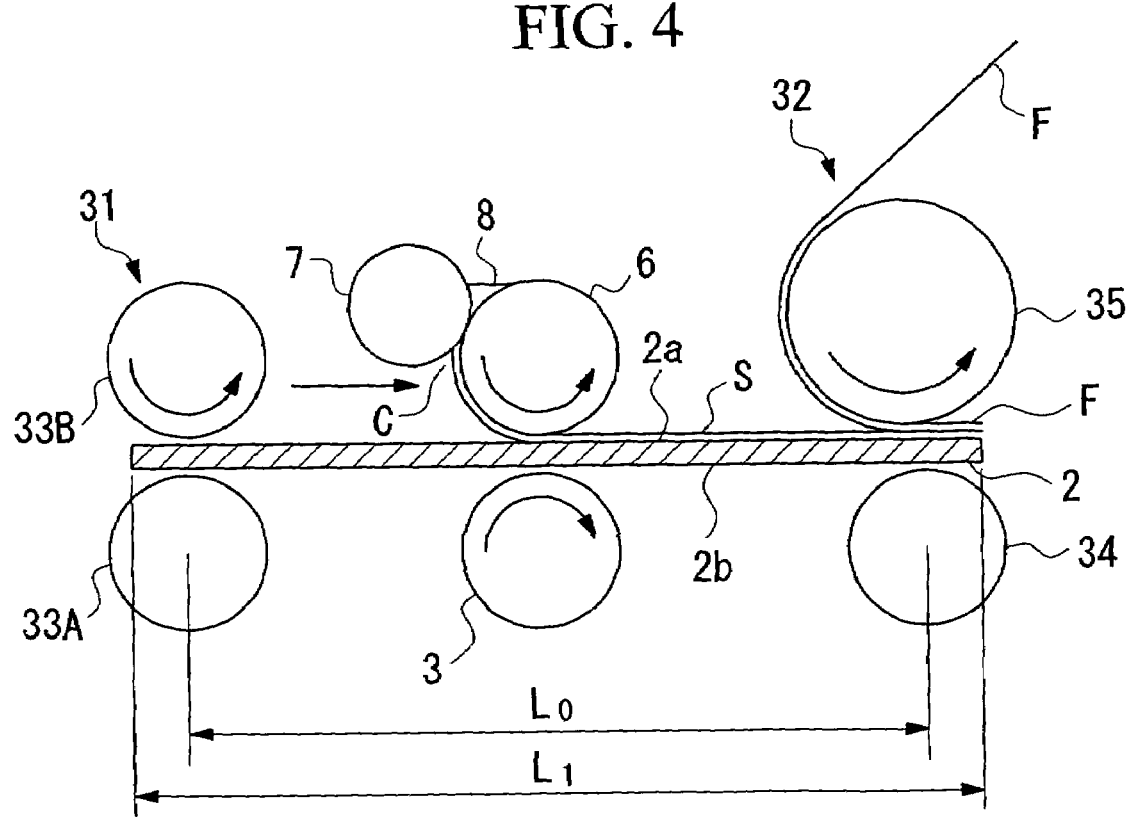
FIG. 4 is a schematic diagram of the device for coating a substrate according to the fourth embodiment of the present invention.

A laminated object is produced with the coating device shown in FIG. 4 by coating the substrate with adhesive under the following conditions and then laminating it with a laminate, using a device as shown in FIG. 3 in which coating sections including a backing roller and applicator roller are arranged over two stages.

Substrate: Plywood measuring 1,800 mm×400 mm×4 mm (lwd)

Conveying speed of substrate: 40 m/min

First applicator roller: A rubber roller having a circumferential speed of 20 m/min and speed reduction ratio of 50% (relative to the predetermined speed at which the substrate is conveyed)

Second applicator roller: A steel roller having a circumferential speed of 30 m/min and speed reduction ratio of 25% (relative to the predetermined speed at which the substrate is conveyed)

Type of backing roller of the first applicator roller: Steel roller

Type of backing roller of the second applicator roller: Rubber roller

Clearance between first applicator roller and its backing roller: 95% of thickness of substrate Clearance between second applicator roller and its backing roller: 98% of thickness of substrate Rotation direction of applicator rollers and conveying direction of substrate: Same direction Adhesive: Polyester polyol-type urethane reactive hot melt adhesive (viscosity of 8,000 mPa·s/125° C.)

Application amount of adhesive: 45 g/m$^2$

Adhesive heating temperature: 125° C.

Laminate: Decorative polyethylene film having the thickness of 160 μm

Laminating roller speed: 40 m/min

The adhesive has a uniform thickness due to the first and second applicator rollers, and a smooth adhesive layer is formed on the substrate, with the film applied on top thereof to obtain a laminated object. The laminated object is free of surface unevenness, is smooth and has aesthetic appeal, with the substrate and film bonding strongly.

COMPARATIVE EXAMPLE 1

In the first embodiment, setting the circumferential speed of the first and second applicator rollers to be the same as the predetermined speed at which the substrate is conveyed led to the surface of the adhesive layer not being smooth, with ripples, so that an aesthetically pleasing laminated object was not obtained.

COMPARATIVE EXAMPLE 2

In the first example, reducing the circumferential speed of the first and second applicator rollers by 15% relative to the predetermined speed at which the substrate is conveyed led to the surface of the adhesive layer lacking smoothness and being rippled, so that an aesthetically pleasing laminated object was not obtained.

When adapting a conventional coating method that uses a roller coater to apply a hot melt adhesive, in which the circumferential speed of the applicator roller and the predetermined speed at which the substrate is conveyed are nearly the same, in addition to indentations remaining due to the surface of the adhesive layer not being leveled, roughening of the substrate surface occurs.

On the other hand, when adapting a reverse coating method, which coats by rotating the applicator roller in the opposite direction to the conveying direction of the substrate, to apply a hot melt adhesive, coating blemishes can occur when the coating amount is low. While smooth coating is obtainable with a large coating amount, specifically, of at least 100 g/m$^2$, the higher adhesive cost makes this impractical.

To sum up, it is difficult to obtain a smooth and thin adhesive layer of uniform thickness by applying a hot melt adhesive on a wood board with coating methods employing conventional roller coaters.

INDUSTRIAL APPLICABILITY

The method of coating a substrate according to the present invention applies a rubbing force that minimizes roughening of the adhesive layer when the applicator roller is retracted, thereby preventing irregularities such as coating unevenness and pinholes to allow the smooth formation of a thin adhesive layer of uniform thickness. Subsequently bonding a laminate thereon produces an aesthetically appealing finish free of indentations and the like.

Furthermore, the method of coating a substrate of the present invention does not require a drying process, making it comparatively more efficient than conventional coating methods, and is free of various problems stemming from use of organic solvents such as sick house syndrome.

In addition, forming an adhesive layer by applying multiple coatings of a hot melt adhesive can minimize roughening by reducing the thickness of the adhesive layer applied in a single coating. Forming an adhesive layer consisting of a plurality of thin adhesive layers serves to prevent irregularities such as coating unevenness and pinholes, thereby enabling the formation of a smooth adhesive layer.

Making the front stage applicator roller and rear stage applicator roller of different materials so as to make the rear stage applicator roller slip more than the front stage applicator roller enables the latter applied adhesive layer to be more smoothly finished.

In addition, in the coating method of the present invention, when using a reactive hot melt adhesive as the adhesive, the reactive hot melt adhesive can be kept in a melted state at a comparatively lower heating temperature of around 100 to 130° C. Particularly when the object to be coated is a wood board, this has the advantage of not causing heat damage to wood materials during coating.

As the substrate coated by the present invention is one coated by any of the aforementioned coating methods so as to have a smooth adhesive layer of thin thickness formed over the entire surface of the substrate, bonding a laminate such as a film, decorative paper or laminate film thereon imparts a high degree of smoothness and aesthetic appeal making it suitable for interior materials and the like.

The device for coating a substrate of the present invention imparts a rubbing force by making the applicator roller slip relative to the adhesive layer applied to the substrate, enabling the formation of a thin and smooth adhesive layer with marginal coating unevenness.

As the device for conveying the substrate of the coating device of a substrate according to the present invention is a backing roller positioned on the opposite side of the applicator roller so as to pinch the substrate or a conveyor belt with a vacuum mechanism, the substrate can be conveyed by the backing roller or the vacuum conveyor belt. Employing a vacuum conveyor belt particularly enables elimination of a speed differential with the substrate.

As the applicator rolls includes multiple stages of applicator rollers arranged along the conveying direction of the substrate, and either the rear stage applicator roller positioned downstream in the conveying direction of the substrate or the front stage applicator roller positioned upstream in the conveying direction of the substrate is a rubber roller, it is possible to eliminate indentations and pinholes and the like in bumpy substrates, such as wood boards, to improve the finish of the adhesive layer.

In addition, as the nipping mechanisms are provided upstream and downstream in the conveying direction of the applicator roller to hold and convey the substrate, setting the speed of the substrate becomes accurate, thereby the speed differential with the applicator roller can be precisely set to allow for stable slippage of the applicator roller.

Also, as the nipping mechanism positioned downstream in the conveying direction of the applicator roller be provided with a laminating roller to apply a laminate on the side of the substrate coated with adhesive, so that the laminate be bonded to the substrate via the adhesive, the laminating roller can be used as a part of the nipping mechanism, thereby the number of rollers can be reduced.

In the method of producing a laminated object according to the present invention, when applying a hot melt adhesive via a rotating applicator roller to one surface of the substrate while conveying the substrate, by setting the circumferential speed of the applicator roller to be at least 20% slower or at least 20% faster than the predetermined speed at which the substrate is conveyed, with the direction of rotation of the applicator roller and the direction of conveying the substrate being the same direction, adhesive is applied to the substrate while slipping the applicator roller to form an adhesive layer on which a laminate is applied, with a laminate such as a film, decorative paper or laminating material laminated on the coated adhesive layer in a state of having adhesiveness without solidifying to obtain a laminated object having an aesthetically appealing finish free of indentations and the like.

The invention claimed is:

1. A method for applying a hot melt adhesive in a melted state to a surface of a substrate, the method comprising the steps of:
   preparing a hot melt adhesive, which is a urethane reactive hot melt adhesive and melts in a temperature range of 100 to 130° C., and a coating equipment including plural applicator roller stages which form an adhesive layer by laminating plural coatings of a hot melt adhesive;
   conveying the substrate which is a wood board at a predetermined speed;
   rotating applicator rollers of the applicator roller stages in the direction, to which the substrate is moved on a conveyer, to cover the substrate with the hot melt adhesive in a melted state, wherein
   at least one applicator roller has a surface made of a material which reduces slipping and the hot melt adhesive is supplied from a pool of the hot melt adhesive existing in a valley formed by the applicator roller and a metering roller via an interface of the rollers, and the applicator roller is rotated at a circumferential speed at least 20% slower or at least 20% faster than the predetermined speed of the substrate to cause the roller to slip; and
   contacting the upper surface of the substrate from above with the applicator rollers to form the adhesive layer on substantially the entirely of the upper surface of the substrate with the hot melt adhesive.

2. The method for applying a hot melt adhesive to a surface of a substrate according to claim 1, wherein the adhesive layer is formed by applying a plurality of coatings of the hot melt adhesive.

3. The method for applying a hot melt adhesive to a surface of a substrate according to claim 1, wherein the circumferential speed of the applicator roller is set to be less than the predetermined speed at which the substrate is conveyed, with a speed reduction ratio ranging from 20% to 80% and equal to (conveying speed of substrate−circumferential speed of applicator roller)×100/conveying speed of substrate.

4. The method for applying the hot melt adhesive to the surface of the substrate according to claim 1, wherein a clearance between the applicator roller and a backing roller is 99% to 95% of the thickness of the substrate.

5. The method for applying the hot melt adhesive to the surface of the substrate according to claim 1, wherein the urethane reactive hot melt adhesive which melts in a temperature range of 100 to 130° C. has a viscosity of 1,000 to 30,000 mPa·s.

6. The method for applying a hot melt adhesive to a surface of a substrate according to claim 1, wherein the laminated object is an architectural material.

7. The method for applying a hot melt adhesive to a surface of a substrate according to claim 1, wherein the substrate is substantially conveyed at a predetermined speed horizontally, while the substrate is conveyed and contacted with the applicator roller.

8. The method for applying a hot melt adhesive to a surface of a substrate according to claim 1, further comprising a step of bonding the adhesive layer formed on the substrate with a laminate which is selected from the group consisting of a film, a decorative paper, a laminate material and a metallic paper.

9. The method for applying a hot melt adhesive to a surface of a substrate according to claim 1, wherein the applicator roller has a surface made of a rubber.

10. The method for applying a hot melt adhesive to a surface of a substrate according to claim 1, wherein the thickness of the adhesive layer is in the range from 20 to 80 μm, and the circumferential speed of the applicator roller is slower than the predetermined speed of the substrate such that the speed reduction ratio is in a range of 20 to 80%.

11. The method for applying a hot melt adhesive to a surface of a substrate according to claim 1, wherein the hot melt adhesive is a polyester polyol-type urethane reactive hot melt adhesive.

12. The method for applying a hot melt adhesive to a surface of a substrate according to claim 1, wherein the applicator rollers comprise a metal applicator roller and a rubber applicator roller.

13. The method for applying a hot melt adhesive to a surface of a substrate according to claim 1, wherein the substrate is conveyed with a conveyor belt.

14. The method for applying a hot melt adhesive to a surface of a substrate according to claim 1, wherein the hot meld adhesive is supplied from the applicator rollers to the surface of the substrate surface at 15 to 60 g/m².

15. A method for producing a laminated object, the method comprising the steps of:
   conveying a substrate which is a wood board at a predetermined speed;
   contacting the upper surface of the substrate from above with plural applicator rollers of plural applicator roller stages which form an adhesive layer by laminating plural coatings of a hot melt adhesive;
   rotating the applicator rollers covered with a hot melt adhesive in a melted state which is supplied from a pool of the hot melt adhesive located between the applicator rollers and metering rollers via an interface of the applicator roller and metering rollers, wherein at least one applicator roller has a surface made of a material which reduces slipping, and is rotated at a circumferential speed at least 20% slower or at least 20% faster than the predetermined speed at which the substrate is conveyed to cause it to slip;
   forming an adhesive layer on substantially the entirely of the upper surface of the substrate with the hot melt adhesive; and
   applying a laminate on the adhesive layer which is formed on the substrate.

16. The method of producing a laminated object according to claim 15, wherein the adhesive is applied by a plurality of applicator rollers.

17. The method of producing a laminated object according to claim 15, wherein the substrate is a wood board, the adhesive is urethane reactive hot melt adhesive, and the laminate is a film or a decorative paper.

18. The method of producing a laminated object according to claim 15, wherein the substrate on which the laminate is applied via the adhesive layer is an architectural material.

19. The method of producing a laminated object according to claim 15, wherein the substrate is substantially conveyed at a predetermined speed horizontally, while the substrate is conveyed and contacted with the applicator roller.

20. The method for producing a laminated object according to claim 15, wherein the laminate is selected from the group consisting of a film, a decorative paper, a laminate material and a metallic paper.

21. The method for producing a laminated object according to claim 15, wherein the applicator roller has a surface made of a rubber.

22. The method for producing a laminated object according to claim 15, wherein the thickness of the adhesive layer is in the range from 20 to 80 μm, and the circumferential speed of the applicator roller is slower than the predetermined speed of the substrate such that the speed reduction ratio is in a range of 20 to 80%.

23. The method for producing a laminated object according to claim 15, wherein the hot melt adhesive is a polyester polyol-type urethane reactive hot melt adhesive.

24. The method for producing a laminated object according to claim 15, wherein the applicator rollers comprise a metal applicator roller and a rubber applicator roller.

25. The method for producing a laminated object according to claim 15, wherein the substrate is conveyed with a conveyor belt.

26. The method for producing a laminated object according to claim 15, wherein the hot meld adhesive is supplied from the applicator rollers to the surface of the substrate surface at 15 to 60 g/m$^2$.

* * * * *